T. P. DRIVER.
LIGHT SHIELD.
APPLICATION FILED NOV. 7, 1913.

1,089,539.

Patented Mar. 10, 1914.

Witnesses
C. L. Perkins
K. M. Sullivan

Inventor
Theodore P. Driver
by
Chas. L. Perkins Atty.

UNITED STATES PATENT OFFICE.

THEODORE P. DRIVER, OF MELROSE, MASSACHUSETTS.

LIGHT-SHIELD.

1,089,539.  Specification of Letters Patent.  Patented Mar. 10, 1914.

Application filed November 7, 1913. Serial No. 799,704.

*To all whom it may concern:*

Be it known that I, THEODORE P. DRIVER, a citizen of the United States, residing at Melrose, in the county of Middlesex and State of Massachusetts, have invented new and useful Improvements in Light-Shields, of which the following is a specification.

My invention relates to automobile accessories, and its object is to provide means for shielding the eyes of the chauffeur from the rays thrown by lights of approaching automobiles when in proximity thereto without materially obscuring his vision.

It is a well known fact that all drivers of automobiles are seriously inconvenienced by the blinding effect of headlights and search lights of the high power in common use at the present time, and that the danger of driving at night is greatly enhanced in consequence. As two cars approach each other the drivers of each when in close proximity very often become blinded by the lights of the other to such an extent that they are practically unable to see any portion of the highway ahead, and all benefit of the lights as regards road illumination is utterly lost. Owing to these conditions, which are aggravated by the desperate efforts of individual motorists, each in self defense, to equip his car with electric headlights of greater power than any in use, that he may "kill" or outshine the lights of those who menace him, it is often difficult for the driver of an automobile to determine when to turn out for an approaching car in order that they may pass in safety.

To obviate the annoyance and danger resulting from the causes mentioned, I have provided a device adapted to be embodied in goggles, or attached to the windshield or other forward part of an automobile, which, intervening between the eyes of the driver and approaching cars, will cut off the rays from the headlights of the latter before the cars have reached relative positions of dangerous proximity, or the driver has become blinded by the glare, and enable him to derive the full benefit of the road illumination afforded by his own lighting plant.

Figure 1:
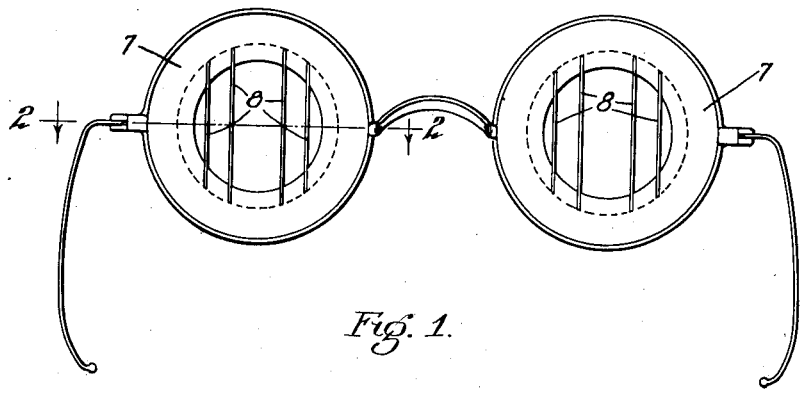
Figure 2:
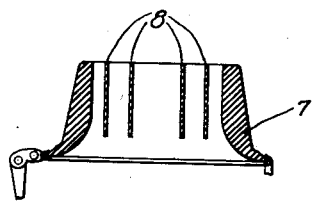
Figure 3:
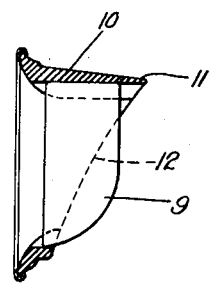
Figure 4:
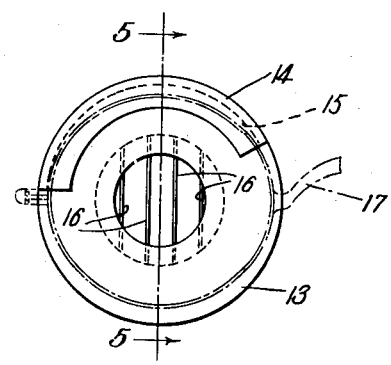
Figure 5:
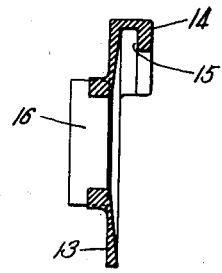
Figure 6:
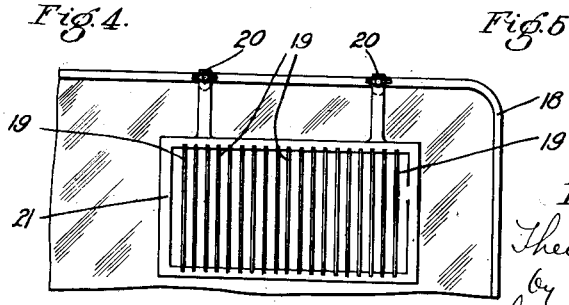

In the accompanying drawing, in which the different figures illustrate various forms in which my invention may be embodied, and in which like numerals of reference indicate like parts throughout, Figure 1 represents the preferred form in which the invention is embodied in goggles. Fig. 2 is a section on line 2—2 of Fig. 1. Fig. 3 shows in section a special type of my goggles possessing certain features of advantage. Fig. 4 shows my device embodied in clips adapted to be hung over the lens edge of ordinary spectacles and retained by flanges. Fig. 5 is a section on line 5—5 of Fig. 4. Fig. 6 shows my device attached to the glass windshield of an automobile.

My invention is simple and consists merely of a series of thin, narrow slats or screens, vertically arranged in a row, their faces parallel and separated from each other by rectangular spaces.

In the drawing, the slats are indicated in Figs. 1 and 2 by the numeral 8, in Fig. 3 by the numeral 9, in Figs. 4 and 5 by the numeral 16, and in Fig. 6 by the numeral 19. The slats are retained in frames indicated respectively in Figs. 1 and 2 by the numeral 7, in Fig. 3 by the numeral 10, in Figs. 4 and 5 by the numeral 13, and in Fig. 6 by the numeral 21. The frame 13 is adapted to be secured to the spectacles, shown in Fig. 4 in dotted lines, and indicated by the numeral 17, by the flange 14 which grips the edge of the lens which is received in the recess 15. The frame 21 is secured by any suitable means as the clamps 20 to the windshield 18 (Fig. 6).

The mode of operation of my device is as follows: The goggles are attached to the head in the usual manner, or as shown in Figs. 4 and 5 the device is attached to the spectacles ordinarily worn, or as in Fig. 6 to the windshield 18 and secured by the clamps 20 after its position has been properly adjusted laterally with reference to the location of the driver's seat. It will be noted that by reason of this adjustability the device is equally well adapted to use on left or right side drive cars. The device in whatever form employed should be so placed that in his normal position looking forward only the rear edges and minimum face area of the slats will be presented to the driver. He will thus be looking through the spaces between the slats which are so thin that no material obstruction of the straight ahead view of the driver results therefrom. The arc of vision is however cut down in some degree, proportionately to the width of the slats and the number within a given space. This adjustment may be varied to suit any individual preference, but I have found that the field of vision contained within an arc of thirty degrees is ample for the purposes of ordinary driving. As another automobile approaches the lights are at first plainly seen ahead, but as soon as a point is reached when, owing to the change of the angle of incidence, all the rays which pass by the front edges of the slats are received and absorbed by the faces of adjacent slats, none of the glare reaches the eyes of the driver. When my goggles are used if it be desired to anticipate this point, the driver has only to turn his head slightly,—enough to cut off the glare without obstructing the view of that portion of the road over which it will be necessary to pass. In the case of the windshield attachment, however, the location of this point is controlled as above stated, wholly by the projection and proximity of the slats. In order to obtain the absorptive power essential to accomplish the best results, the slats should be constructed of some dark material, or painted dull black. Any desired type of goggles or supporting frame may be employed to retain the slats in position. I have found in practice that goggles provided with apertures one inch in diameter and having four intermediate screens approximately ⅜ inch wide separated by spaces of 3/16 inch between the first and second and third and fourth screens, and ⅜ inch between the second and third screens furnish a convenient and successful application of my invention, although I do not mean to indicate that the dimensions given constitute its best embodiment, as a wide difference of tastes and preferences will doubtless be found among users, and of requirements in the varied uses and locations to which the invention may be put.

An excellent form of goggles is that shown in Fig. 3 in which the frame 10 is provided with projections 11 at the top and cut away at the bottom as shown by the dotted line 12, and combined in the relation shown with screens 9 cut away in a curve at their lower extremities thus enlarging the field of vision in the vicinity of the operating mechanism.

It is obvious that my invention is applicable to many uses other than in connection with the operation of vehicles, and it includes a device of the character described interposed in the line of vision of the user in whatever form it may be embodied or supported, for the purpose of excluding rays of light.

What I claim and desire to secure by Letters Patent is:

1. In a light shield, a row of three or more vertically arranged, non-contiguous screens.

2. In a light shield, a vertical screen at each extremity, and a non-contiguous vertical screen intermediate thereof.

3. In a light shield, a vertical screen at each extremity, and a plurality of non-contiguous vertical screens intermediate thereof.

4. In a light shield, a frame and a row of three or more non-contiguous vertically arranged thin screens retained therein, said screens having darkened surfaces.

5. In a light shield, a row of three or more screens, vertically arranged and separated from each other by substantial spaces.

6. Motor goggles, comprising a frame, and a row of three or more vertically arranged non-contiguous screens contained therein.

7. Motor goggles comprising a frame and a row of three or more vertically arranged screens retained therein, said screens having their front edges cut away at their lower extremities, and said frame provided with a projection at the top extending beyond the upper extremities of the screens.

In testimony whereof I have hereunto set my hand in presence of two subscribing witnesses, this 5th day of November 1913.

THEODORE P. DRIVER.

Witnesses:
CARROLL L. PERKINS,
J. BUTLER STUDLEY.